United States Patent [19]

Shih

[11] Patent Number: 4,546,140

[45] Date of Patent: Oct. 8, 1985

[54] ONE-PACKAGE AQUEOUS LATICES CONTAINING ALKALINE-CURABLE SELF-CROSSLINKING POLYMERS

[75] Inventor: Yen-Jer Shih, Piscataway, N.J.

[73] Assignee: National Starch and Chemical Corporation, Bridgewater, N.J.

[21] Appl. No.: 636,899

[22] Filed: Aug. 2, 1984

[51] Int. Cl.[4] .......................... C08K 5/04; C08K 5/09
[52] U.S. Cl. ..................................... 524/394; 524/397; 524/399; 524/400; 524/503; 524/516; 524/519; 524/548; 524/551; 524/815; 524/500; 524/502; 525/366; 525/370; 525/386
[58] Field of Search ............ 524/394, 397, 400, 551, 524/815, 399, 519, 500, 502, 503, 516, 548; 525/366, 370, 386

[56] References Cited

U.S. PATENT DOCUMENTS

| | | | |
|---|---|---|---|
| 2,601,597 | 9/1946 | Daniel et al. | 528/492 |
| 3,095,390 | 6/1963 | Maeder | 524/47 |
| 3,287,305 | 11/1966 | Maeder | 523/410 |
| 3,314,905 | 4/1967 | Luce et al. | 260/8 |
| 3,678,098 | 7/1972 | Lewis et al. | 526/292.2 |
| 3,694,393 | 9/1972 | Lewis et al. | 204/129.74 |
| 3,702,799 | 11/1972 | Lewis et al. | 273/1.5 R |
| 3,976,824 | 8/1976 | Ariyoshi et al. | 525/328.4 |
| 3,988,503 | 10/1976 | Ariyoshi et al. | 525/329.4 |
| 4,069,174 | 1/1978 | Nakata et al. | 524/394 |

FOREIGN PATENT DOCUMENTS

| | | |
|---|---|---|
| 1109875 | 6/1961 | Fed. Rep. of Germany . |
| 1231372 | 12/1966 | Fed. Rep. of Germany . |
| 1282600 | 11/1968 | Fed. Rep. of Germany . |
| 1904743 | 9/1970 | Fed. Rep. of Germany . |
| 1911306 | 9/1970 | Fed. Rep. of Germany . |
| 1513899 | 2/1968 | France . |
| 1573457 | 7/1969 | France . |

Primary Examiner—Joseph L. Schofer
Assistant Examiner—J. M. Reddick
Attorney, Agent, or Firm—Margaret B. Kelley; Edwin M. Szala

[57] ABSTRACT

Shelf-stable, one-package aqueous latices, which are curable with or without the application of heat, consist essentially of an alkaline-curable, self-crosslinking emulsion polymer, selected organic metal salts, and water. The alkali, alkaline earth, or heavy metal salts of $C_1$–$C_6$ organic acids (e.g., sodium acetate) are post-added to th polymer emulsion or present during the polymerization. The polymer typically comprises about 90–99.9% by weight of one or more vinyl polymerizable monomers (e.g., acrylates, vinyl esters, and ethylene) and 0.1–10% by weight of a polymerizable non-ionic or cationic self-crosslinking monomer containing halohydrin groups (e.g., 3-chloro-2-hydroxypropyl (meth)acrylate or the reaction product of epichlorohydrin and N,N-dimethylaminopropyl methacrylamide or methacrylate).

14 Claims, No Drawings

ONE-PACKAGE AQUEOUS LATICES CONTAINING ALKALINE-CURABLE SELF-CROSSLINKING POLYMERS

BACKGROUND OF THE INVENTION

This invention relates to storage-stable, one-package, self-crosslinking aqueous latices useful as adhesives, coatings or binders.

Vinyl ester based and ethylene-vinyl acetate based polymers have been used for some time in adhesives, coatings, and binders. When the polymers contain a functional group such as a carboxyl group, the polymers are cured by the addition of a co-reactant (i.e., crosslinker) to the polymer emulsion or solution. When the polymers contain a functionality that is self-reactive, the use of a co-reactant species per se is not necessary. The advantages of self-crosslinking polymer systems are their simplicity, economy, and efficiency.

Latices containing self-crosslinking polymers prepared from cationic functional monomers are disclosed in U.S. Pat. Nos. 3,678,098, 3,694,393 and 3,702,799 issued July 18, Sept. 26, and Nov. 14, 1972 to Sheldon N. Lewis et al. and U.S. Pat. Nos. 3,095,390 and 3,287,305 issued June 25, 1963 and Nov. 22, 1966 to A. Maeder. Latices containing self-crosslinking polymers prepared from the non-ionic functional monomers 3-chloro-2-hydroxypropyl methacrylate are described in the technical data sheet of Alcolac for Sipomer ®.CHPM. 3-Chloro-2-hydroxypropyl acrylate (CHPA) is disclosed as useful in various polymers or polymeric formulations such as a polymer of butyl acrylate, methyl methacrylate, acrylonitrile, acrylic acid and CHPA useful in a printing paste (see Ger. Pat. No. 1,282,600 issued 11/14/68 to K. Craemer et al., CA 70 48583q); polymers containing CHPA and at least one functional monomer from a chemically different class which are useful as curing agents for gelatin layers (see Ger. 1,109,875 issued June 29, 1961 to E. J. Birr et al., CA 56 1094b); adhesives from a proteinaceous matter, vinyl acetate, and CHPA (see U.S. Pat. No. 3,314,905 issued Apr. 18, 1967 to S. B. Luce et al.); a polymer of methyl methacrylate, butyl acrylate, and CHPA in an aqueous dispersion which is useful for coating plasticized poly(vinyl chloride) (see Ger. Pat. No. 1,231,372 issued Dec. 29, 1966 to G. Welzel et al., CA 66 56674c); polymers of styrene, 2-ethylhexyl acrylate, N-(butoxymethyl) methacrylamide, acrylic acid, and optionally CHPA useful in printing inks as a self-crosslinkable binder (see Fr. Pat. No. 1,573,457 issued July 4, 1969 to Badische Anilin- und Soda-Fabrik A.G., C.A. 42 56820 w); a polymer of butyl acrylate, acrylonitrile, and CHPA in a cotton fabric dye composition (see Fr. Pat. No. 1,513,899 issued Feb. 16, 1968 to Badische Anilin- und Soda-Fabrik A.G., CA 70 97911d); a crosslinkable ethylacrlyate-CHPA copolymer useful in admixture with a solution or dispersion of another crosslinking monomer as an adhesive coating (see Ger. Offen. No. 1,904,743 published Sept. 10, 1970 by H. Reinhard et al., CA 73 99733h); and a polymer of 2-ethylhexyl acrylate, n- and tert-butyl acrylate, N-vinyl pyrrolidinone, acrylic acid, and CHPA useful as an aqueous adhesive coating (see Ger. Offen No. 1,911,306 published Sept. 10, 1970 by H. Reinhard, CA 73 110607t). The polymers are crosslinked under alkaline conditions with or without the use of heat. Alkali (e.g., sodium and ammonium hydroxide) and alkaline salts (e.g., sodium sesquicarbonate and sodium or potassium carbonate) are used for the cure.

The major problem associated with these alkaline-curable latices is their short pot life. The need to blend the curing agent with the latices just prior to their use is inconvenient. There is a need therefore for a one-package latex which is shelf-stable but still capable of self-crosslinking after application.

SUMMARY OF THE INVENTION

The present invention provides a shelf-stable, curable, one-package latex which consists essentially of a dispersion of an alkaline-curable, self-crosslinking emulsion polymer in water and a salt of an organic acid having the formula

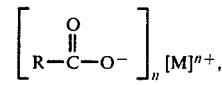

where R is H or a $C_1-C_6$ straight or branched chain alkyl or $C_2-C_6$ alkenyl, M is an alkali, alkaline earth, or heavy metal and n is the valence number of M; the self-crosslinking polymer comprising a vinyl polymerizable monomer and a polymerizable cationic or nonionic self-crosslinking monomer containing halohydrin groups; the salt being present in an amount effective to cure the polymer, with or without the application of heat, after application of the dispersion, and removal of the water therefrom. Suitable self-crosslinking monomers include cationic quaternary ammonium monomers having the formula

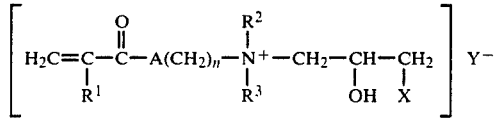

and nonionic monomers having the formula

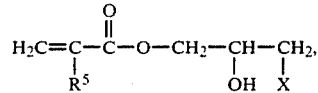

where $R^1$ and $R^5$ are hydrogen or a methyl group; A is —O— or

with $R^4$ being hydrogen or a $C_1-C_3$ alkyl group; $R^2$ and $R^3$ are independently $C_1-C_6$ alkyl groups; X is a halogen; Y is an anion; and n is 1-4. Typically the self-crosslinking polymer comprises about 90-99.9% by weight of the vinyl polymerizable monomer and about 0.1-10% by weight of the halohydrin-containing monomer. As used herein, the term "stable" applies to a latex that is shelf-stable (i.e., where there is no increase in grits and/or viscosity and/or phase separation in the latex and/or coagulation of the polymer) and is still capable of curing (i.e. crosslinking) to provide the desired end use performance.

The salt may be introduced into the latex by addition to an already prepared polymer latex or by inclusion in one of the charges used in the preparation of the polymer latex. Typically a substantially equivalent amount of salt, based on the moles of cationic or non-ionic functional monomer, will be effective. The effect of the salt on the polymer may be determined by studying the % insolubles formed after cure. With acrylate-based polymers the use of additional salt will lead to a reduction in % insolubles. With vinyl acetate-based polymers, however, salt amounts in excess of that needed to provide the equivalent amount of alkali do not reduce the % insolubles. Hence, the effective amount of salt to be used may vary with the salt, the type and amount of functional monomer used, and the polymer type (acrylate vs. vinyl acetate). It will also depend upon the degree of crosslinking desired, which may vary depending upon the intended end use.

Typical non-functional vinyl polymerizable monomers include vinyl esters, alkyl (meth)acrylates, styrene and mixtures thereof as well as ethylene-vinyl acetate and mixtures thereof with other vinyl polymerizable monomers. The monomer type and amount depends upon the end use (i.e., laminating adhesive, pressure sensitive adhesive, binder, and the like).

Typical functional monomers include the cationic monoethylenically unsaturated ester monomers derived from N,N-dialkylaminoalkyl esters of (meth)acrylic acid and epihalohydrins, the cationic monoethylenically unsaturated ester monomers derived from N,N-dialkylaminoalkyl amides of (meth)acrylic acid and epihalohydrins, and the non-ionic ethylenically unsaturated ester monomers derived from (meth)acrylic acid and epihalohydrins. It may also be possible to use other monomeric polymerizable chlorohydrin esters or amides prepared by the reaction of epichlorohydrin and other unsaturated acids such as crotonic, furmaric, maleic, and itaconic acids or their N,N-dialkyl-aminoalkyl esters or amides.

In the vinyl ester polymers, the vinyl ester is present in amounts of at least about 5%, the functional monomer is present in amounts of about 0.1–10%, and any optional vinyl polymerizable monomer is present in amounts of about 0–94.9%. In the ethylene-vinyl acetate polymers, the monomer amounts are about 0.5–40% ethylene, up to about 89.5% vinyl acetate, about 0.1–10% cationic monomer, and 0–5% of any optional vinyl polymerizable monomer. The amounts are by weight and total 100%. As used herein, the term "functional" monomers refers to those monomers containing halohydrin or epoxide groups which are capable of self-crosslinking under alkaline conditions.

Suitable salts include alkali, alkaline earth, or heavy metal salts of organic acids (e.g. sodium, potassium, calcium, aluminum, or lead formate, acetate, propionate and the like). The salt acts as a latent curing agent which, after application of the latex and the removal of the water, cures the self-crosslinking monomer. Since the salt does not raise the pH of the latex during storage, the shelf-stability is good. It is believed that during drying the pH is raised by the in situ generation of a strong alkali when the organic acid anion is removed as a volatile acid. Drying may be carried out at room temperature or an elevated temperature depending upon the end use and, more importantly, the volatility of the acid. For example, sodium acetate is capable of curing the polymers at room temperature. The volatile acetic acid is removed with the water during drying and the sodium hydroxide produced is believed to effect the cure.

DESCRIPTION OF THE PREFERRED EMBODIMENTS

The vinyl esters suitable for use herein include preferably vinyl acetate, other vinyl esters of saturated aliphatic monocarboxylic acids containing up to 6 carbon atoms such as vinyl propionate and the like, and ethylene-vinyl acetate.

Other vinyl polymerizable monomers include monomers such as esters of (meth)acrylic acid with $C_1$–$C_{18}$ alcohols, including $C_1$–$C_{18}$ alkanols, benzyl alcohol, cyclohexyl alcohol, and isobornyl alcohol, such as methyl, ethyl, butyl, 2-ethylhexyl, or octadecylacrylate or methacrylate; (meth)acrylamide and their N-substituted derivatives, such as N-mono and N-dimethyl, -ethyl, -propyl, and -butyl acrylamide or methacrylamide and N-mono- or diphenylacrylamide; vinyl ethers such as butyl vinyl ether; N-vinyl lactams such as N-vinyl pyrrolidinone; halogenated vinyl compounds such as vinyl chloride and vinylidene chloride or flouride; alkyl vinyl ketones such as methyl or ethyl vinyl ketone; diesters such as dimethyl, diethyl, dipropyl, dibutyl, diphenyl, dibenzyl, and di(phenylethyl) itaconate, maleate, and fumarate; (meth)allyl ester of saturated aliphatic monocarboxylic acids, such as allyl and methallyl acetates, propionates, and valerates; vinyl compounds such as vinyl pyrrole; and olefins such as ethylene. Minor amounts (e.g. 0.01–2%) of crosslinking monomers such as diallyl maleate and triallyl cyanurate are also useful herein.

The functional cationic monomers suitable for use herein are quaternary ammonium compounds represented by the formula given above. Typically the anion is $Cl^-$, $Br^-$, $R'CO_2^-$, $NO_3^-$, $SO_4^-$, or like anions derived from inorganic or organic acids.

The ester monomer may be prepared according to the procedure described in U.S. Pat. No. 3,678,098 (cited earlier), the disclosure of which is incorporated herein by reference. An epihalohydrin, preferably epichlorohydrin, is reacted under acid conditions with the hydrogen acid salt of a basic ester of the formula

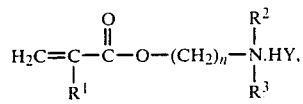

wherein $R^1$, $R^2$, $R^3$, Y and n, are as defined hereinabove. The reaction is carried out at from ambient temperature to 80° C., preferably 50° C. or less, in an aqueous medium. The epihalohydrin, used in at least a stoichiometric amount, is generally added to the aqueous salt solution. It is essential to maintain the pH on the acid side to avoid side reactions. A polymerization inhibitor (e.g. monomethyl ether of hydroquinone, hydroquinone, or phenothiazine) may be used. The monomers are obtained in high yield in the aqueous reaction medium. They may be stored as the aqueous solution or concentrated or even isolated by vacuum vaporization of the water.

The cationic amide monomer may be prepared according to the procedure of U.S. Pat. No. 3,095,390 (cited earlier), the disclosure of which is incorporated herein by reference. They may be prepared using the above procedure except that the hydrogen acid salt of a suitable basic amide is used. The salt has the formula

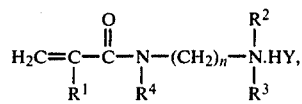

wherein $R^1$, $R^2$, $R^3$, $R^4$, Y and n are as defined above. The ester monomer can also be prepared by the reaction of methacrylic acid or acrylic acid with epihalohydrin.

The functional non-ionic monomers suitable for use herein are the reaction products of (meth)acrylic acid and an epihalohydrin, preferably epichlorohydrin. The preparation of 3-chloro-2-hydroxypropyl methacrylate is well known and described in an article by M. Yoshino et al. ("Derivatives of Epichlorohydrin IX. Synthesis of Glycidyl Ethers. 1." in Yukagaku 15 (11), 573–8, 1966, CA 66 46073s). The reaction is carried out at up to 110° C. in the presence of a catalyst such as tertiary amines (e.g., triethylamine or pyridine) or quaternary ammonium salts. Solvents have no desirable effect on the reaction. The order of addition of the reactants does affect the reaction and the slow addition of epichlorohydrin to the acid is preferred.

The vinyl ester based polymers are prepared using conventional aqueous emulsion polymerization techniques, i.e., with the use of an initiator or redox system and a surfactant. The ethylene-vinyl acetate based polymerizations are likewise carried out using conventional aqueous ethylene-vinyl acetate emulsion polymerization techniques, i.e., under pressure with the use of a redox system and surfactant.

Suitable initiators include azo initiators (e.g., 2,2'-azobisisobutyl nitrile), peroxides (e.g. hydrogen peroxide), and redox systems (e.g. t-butyl hydroperoxide with sodium formaldehyde sulfoxylate). In the preferred polymerization process, a water-soluble azo initiator (e.g., 2,2'-azobis(2-amidinopropane) hydrochloride or azo-N,N'-dimethylene isobutyramidine hydrochloride) is used in combination with a water-soluble chain transfer agent such as an amino thiol salt (e.g., cysteamine hydrochloride also referred to as aminoethane thiol hydrochloride or 2-diethylaminoethane thiol hydrochloride). The water-soluble azo initiator is used in amounts from about 0.05–1%, preferably in amounts of about 0.18–0.4%; the chain transfer agent is used amounts of about 0.001–0.2%, preferably about 0.002–0.12%, both by weight based on the polymer solids.

A cationic or non-ionic surfactant is used with the cationic self-crosslinking monomer. Any surfactant may be used with the nonionic self-crosslinking monomer. The cationic and ionic surfactants useful herein are conventional and disclosed in U.S. Pat. No. 3,287,305 (cited earlier). Typically they are used in amounts of 0.5–6% by weight based on polymer solids. Suitable cationic surfactants include a compound of a higher fatty amine with an acid selected from the group consisting of acetic acid, hydrochloric acid and sulfuric acid; a salt of diethylaminoethyl ester of a higher fatty acid; oleyl amido ethyl-diethylamine acetate; and a quaternary ammonium compound such as cetyldimethylbenzyl-ammonium chloride, cetyl-trimethylammonium bromide, para(trimethylammonium)benzoic acid cetyl ester methosulphate, [γ-(laurolyamino)-propyl]-trimethylammonium methosulfate, cetylpyridinium methosulphate, octadecyltrimethylammonium bromide, and the quaternary ammonium compound from diethyl sulphate and triethanolamine tristearate.

Suitable nonionic surfactants include polyglycol ethers of a fatty acid, fatty amine, or fatty alcohol, octylphenol polyglycol ether, and polyhydric alcohol partially esterfied with a higher fatty acid.

Optionally and preferably, the latices will also include additive amounts of compatible additives of the type common to the adhesive, coating, and binder arts such as stabilizers (partially hydrolyzed polyvinyl alcohol), fillers, pigments, plasticizers, thickeners (water-soluble cellulose derivatives, polyvinyl alcohols and polyacrylamides), dispersants, defoamers, dyes, tackifiers, and the like. The latices will typically contain at least 25% by weight of water (i.e., they will have solids content of up to about 75% by weight, preferably about 40–60% by weight) with the solids content depending upon the end use.

The following examples will more fully illustrate the embodiments herein. In the examples all parts are given by weight and all temperatures are in degrees Celsius unless otherwise noted. Brookfield viscosities (20 RPM) are measured at the indicated latex solids, and intrinsic viscosities (I.V.) are determined in dimethyl formamide (DMF) or tetrahydrofuran (THF) at 30° C. Deionized water was used in the preparation of the solutions and emulsions used for the polymerizations.

The test procedure used to evaluate the performance of the adhesives herein include standard tests developed by the Specifications and Technical Committee of the Pressure Sensitive Tape Council in Glenview, Ill. The shear adhesion (holding power) test (PSTC-7) is described at p. 30, of the 7th edition of Test Methods for Pressure Sensitive Tapes 91976). The shear adhesion at 37° C. (100° F.) and 100% relative humidity was determined first. If the laminate did not fail, the shear adhesion of the same laminate at 82° C. (180° F.) was then determined. The peel adhesion test for single coated tapes 180° angle (PSTC-1) is described at pp. 22.

EXAMPLE I

This example describes the preparation of a cationic amide monomer, the preparation of a high solids aqueous polymer latex containing sodium acetate and a high molecular weight cationic polymer prepared from ethyl acrylate (EA), 2-ethylhexyl acrylate (2-EHA), and the self-crosslinkable cationic amide monomer. It also shows the use of the latex as a laminating adhesive.

Part A—Preparation of the Cationic Monomer

A 12-1. reactor equipped with a thermometer, agitator, addition funnel, and condenser was charged with 2968 g. water and 3060 g. N,N-dimethylaminopropyl methacrylamide (DMAPMA). The solution was cooled to 20° C. and 1820 g. of concentrated hydrochloric acid were added slowly over 2 hr. while maintaining the temperature below 30° C. Then 1332 g. epichlorohydrin (EPI) were added slowly over 2.5 hr. while maintaining the temperature at 30°–35° C. The solution was held overnight and then adjusted to pH 4–4.5 with hydrochloric acid. The unreacted EPI was removed by vacuum stripping at 63°–68° C. and the distillate was replaced with the same amount of water during stripping.

The resulting solution (53.6% solids) contained the quaternary ammonium salt which is the adduct of DMAPMA and EPI and which is referred to as DPE. The salt has the following formula:

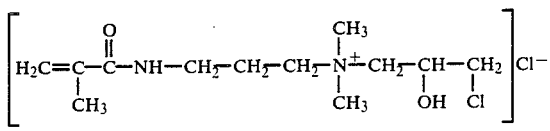

Part B—Preparation of the Polymer Latex

A 2-liter four-neck flask was fitted with a thermometer, condenser, agitator, subsurface nitrogen purge, and suitable additional funnels. The following charges were prepared.

- A. 3.4 g. 70% octylphenol with 30 moles ethylene oxide (EO), 4.5 g. octylphenol with 4 moles EO, 0.003 g. ferric sulfate, and 0.06 g. t-butyl hydrogen peroxide (t-BHP) in 192.5 g. water and adjusted to pH 4 by acetic acid
- B. 25.0 g. ethyl acrylate (EA)
- C. 0.06 g. sodium formaldehyde sulfoxylate (SFS)
- D. 425.0 g. EA, 50.0 g. 2-ethylhexyl acryate (2-EHA) and 0.6 g. t-BHP emulsified in a mixture of 105.0 g. water, 32.5 g. 70% octylphenol with 30 moles EO, 2.5 g. octylphenol with 4 moles EO, and 27.0 g. monomer solution of Part A
- E. 0.6 g. SFS in 20.0 g. water
- F. 0.5 g. t-BHP in 5.0 g. water
- G. 0.5 g. SFS in 5.0 g. water The initial charge A was added to the flask and the mixture was purged subsurface with nitrogen for 1 hr. Agitation was started and charge B was added. The mixture was heated to 55° C. while charge C was added at 35° C. Ten minutes later charges D and E were added separately and slowly over 4.5 hr. at 55° C. The mixture was maintained at 55° C. for 10 min. Then charge F was added in one shot and 5 min. later charge G was slowly added over 10 min. The batch was then held for 10 min. at 55° C., cooled, and discharged.

Part C—Preparation and Use of The Thickened Latex as a Laminating Adhesive

The latex of Part B was compounded with 0.3% sodium acetate (NaOAc), thickened to 17,000 cps. with hydroxyethyl cellulose and sprayed over fiberglass. The adhesive-coated fiberglass was dried for 5 min. at 90° C. (200° F.), then passed through a hot press cycle at 93° C. for 30 sec., and aged for one week at room temperature. It exhibited excellent shear adhesion to polyurethane foam. For example, 1 square inch of the fiberglass/polyurethane foam laminate was loaded with a 300 gm. weight. The laminate did not fail after 24 hr. at 37° C. and 100% relative humidity. On further testing the same laminate did not fail even after 8 hours at 80° C.

A comparative latex was prepared as above except that 2% sodium sesquicarbonate (a known alkaline curing agent) was used in place of sodium acetate. The latex was similarly thickened (16,000 vs. 17,000 cps.) with hydroxyethyl cellulose. A laminate of the adhesive-coated fiberglass and polyurethane foam did not fail in the above high humidity and high temperature tests.

Another latex was prepared as in Part B except that 1.5 g. of sodium acetate was present in Charge D. The thickened latex was comparable to that prepared by adding the sodium acetate after the polymerization. A laminate of the adhesive-coated fiberglass and polyurethane foam did not fail in the above high humidity and high temperature tests.

A control latex prepared as above but without a curing agent (i.e., no sodium acetate or sodium sesquicarbonate) and thickened to 16,000 cps with hydroxyethyl cellulose was evaluated. In the shear adhesion test a laminate of the adhesive-coated fiberglass and polyurethane foam failed after 30 minutes at 37° C. and 100% relative humidity vs. no failure after 24 hours for the salt-cured latex. The control laminate was not evaluated at 82° C. as it did not pass the humidity test.

The results show that the latent curing agent was as effective as the prior art alkaline curing agent.

EXAMPLE II

This example demonstrates the storage stability of aqueous polymer latices containing sodium acetate as the latent curing agent.

A latex was prepared as in Example I and thickened to 17,000 cps. The latex was used, both before and after storage for 4 weeks at 49° C. (120° F.), to coat fiberglass and then prepare fiberglass/polyurethane foam laminates. Both laminates exhibited excellent shear adhesion at high humidity and high temperature. The viscosity of the stored latex was approximately the same, i.e., 16,500 cps.

A portion of the comparative latex of Example I (containing 2% sodium sesquicarbonate) was also aged at 49° C. The viscosity increased from 16,000 to 18,000 cps. after 2 weeks and then to 19,250 cps. after 4 weeks. A fiberglass/polyurethane foam laminate prepared using the adhesive aged for 2 weeks showed only a 4 hour maximum shear adhesion at 37° C. and 100% relative humidity; it was not evaluated for high temperature adhesion as it failed the high humidity test.

The results show that the sodium acetate-containing latex provided excellent shear adhesion even after storage, whereas the sodium sesquicarbonate-containing latex did not.

EXAMPLE III

This example describes the preparation of a functional cationic ester monomer and the preparation of a high solids aqueous polymer latex containing a high molecular weight polymer prepared as in Example I but using the cationic ester monomer.

Part A—Preparation of the Cationic Monomer

A 4-neck, 1-l, flask equipped with a thermometer, agitator, addition funnel, and condenser was charged with 219 g. water and 108 g. concentrated hydrochloric acid. The solution was cooled to 10° C. and 169 g. N,N-dimethylaminoethyl methacrylate (DMAEMA) was slowly added over 2 hr. at such a rate that the contents were maintained at less than 15° C. Then 70 g. epichlorohydrin (EPI) were added in one shot. The solution was held overnight with stirring and then adjusted to pH 3.5 with hydrochloric acid. The unreacted EPI was removed by vacuum stripping at about 60° C.

The resulting solution (72.2% solids) contained the quaternary ammonium salt which is the adduct of DMAEMA and EPI and which is referred to as DEE. The salt has the following formula:

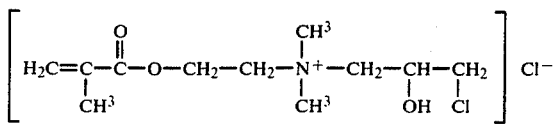

Part B—Preparation of the Polymer Latex

The polymerization was carried out as in Example I except that 21.0 g. of the above monomer solution was used in charge D in place of the 27.0 g. of the cationic monomer of Part A of Example I. The resulting latex was 58.0% solids. Compounded with 0.5% sodium acetate (slightly less than an equivalent amount), the reflux insolubles of the cast film in DMF were 36%. A film cast from the control which contained no curing agent, but which was similarly oven-cured, had only 9% insolubles.

EXAMPLE IV

The latices of Example I, but not thickened as in Example I, were compounded with the indicated amount of salt and cast as films on a metal plate. The films were air-dried overnight at room temperature and then baked for 5 min. at 130° C. The reflux insolubles of the oven-cured films in DMF were determined. The results are given in Table I.

TABLE I

| Latent Curing Agent | | |
|---|---|---|
| Salt | Amount Used (wt. %) | Insolubles Oven Cured (%) |
| Control | — | 2* |
| $HCO_2Na$ | 0.20 | 20 |
| $HCO_2Na$ | 0.40** | 43 |
| $CH_3CO_2Na$ | 0.20 | 24 |
| $CH_3CO_2Na$ | 0.50** | 39 |
| $C_2H_5CO_2Na$ | 0.30 | 35 |
| $C_2H_5CO_2Na$ | 0.50 | 41 |
| $C_3H_7CO_2Na$ | 0.67** | 25 |
| $C_5H_{11}CO_2Na$ | 0.84** | 20 |
| $C_6H_{13}CO_2Na$ | 0.92** | 14 |
| $C_7H_{15}CO_2Na$ | 1.00** | 12 |
| $C_9H_{19}CO_2Na$ | 1.18** | 19 |
| $C_{11}H_{23}CO_2Na$ | 1.34** | 38 |
| $(CH_3CO_2)_2Ca$ | 0.49** | 52 |
| $(CH_3CO_2)_2Ca$ | 0.98 | 31 |
| $(CH_3CO_2)_3Al$ | 0.43** | 7 |
| $(CH_3CO_2)_3Al$ | 0.86 | 11 |
| $(CH_3CO_2)_2Pb.3H_2O$ | 1.20** | 26 |
| NaCl*** | 0.50 | 2 |
| Na Sulfate*** | 0.50 | 1 |
| Na Oxalate*** | 0.50 | 2 |
| Na Oxalate*** | 1.00 | 2 |

*Control typically ran between 0.5-5%.
**Approximately equivalent amount based on self-crosslinking monomer.
***Comparative.

The results show that a number of metals can be used as the cation. The results also show that the anions from various organic acids (up to $C_{11}$) are suitable as latent curing agents; however, as will be shown in Example IX, not all organic salts give storage stable latices. They further show that inorganic and organic salts (sodium chloride, sodium sulfate, sodium oxalate) that form strong acids are not suitable, i.e. they do not crosslink the polymer as indicated by the low % insolubles, which was about the same as the control.

EXAMPLE V

This example demonstrates that a non-ionic functional monomer containing halohydrin groups can be used in the preparation of polymer latices containing the salts as latent curing agents.

The polymer latex was prepared as in Example I except that 10.0 gm. of 3-chloro-2-hydroxypropyl-methacrylate and 7.5 g. 60% aqueous solution of dimethylaminopropyl methacrylamide were used instead of 27.0 g. of the cationic functional monomer solution of part A of Example I. In compounding 0.5% NaOAc (~equivalent amount) was used instead of 0.3%. A film was cast and oven-cured as in Example II. The reflux insolubles of the cast film in DMF was 21%. A film cast from the control which contained no curing agent but was similarly oven-cured had only 3.0% insolubles.

EXAMPLE VI

This example demonstrates the preparation of additional latently curable polymer latices using vinyl acetate (VA) and butyl acrylate (BA). It also demonstrates the use of the latex as a binder.

The polymerization was carried out as in Example I using the following charge:
A. 0.25 g. cetyltrimethylammonium chloride (CTMAC) 3.0 g. 70% octylphenol with 30 moles EO, 0.3 g. octylphenol with 10 moles EO, 8.0 g. cationic monomer solution of Part A of Example I, and 0.5 g. 2,2'-azobis (2-amidinopropane) hydrochloride (AAP) in 300 g. water
B. 50.0 g. VA and 5 g. BA
C. 200.0 g. VA and 245 g. BA emulsified in a mixture of 100 g. water, 21.45 g. 70% octylphenol with 30 moles EO, 2.5 g. octylphenol with 10 moles EO, 0.5 g. CTMAC, 0.22 g. cysteamine HCl, and 32.4 g. cationic monomer solution of part A
D. 1.5 g. AAP in 46 g. water The initial charge A was added to the flask and the mixture was purged subsurface with nitrogen for 30 min. Agitation was started and charge B was added. The mixture was heated to 75° C.; 5 min. after reflux stopped, charges C & D were added separately and slowly over 4.5 hours and 5 hours, respectively. The batch was then held for 1 hour, cooled and discharged. The resulting latex was 47.1% solids.

The latex was blended wdth 1% NaOAc and 1% didodecyl dimethyl ammonium chloride (a cationic surfactant), diluted to 40% solids with deionized water, and used to saturate a polyester web. After drum drying, the web had a strength of 0.55 lb./in. and dry strength of 1.4 lb./in. Without sodium acetate, the wet and dry strengths were 0.21 lb./in. and 0.9 lb./in., respectively.

The results show that the latent curing agent was effective with a vinyl acetate/butyl acrylate polymer containing functional cationic groups and that the crosslinked polymer imparted strength when used as a binder for polyester webs.

EXAMPLE VII

This example demonstrates the preparation of a latently curable polymer latice using ethylene (E), vinyl acetate (VA) and DPE. The following charges were prepared:
A. 0.33 CTMAC, 1.5 g. 70% octyl phenol with 30 moles EO, 0.15 g. octylphenol with 10 moles EO, 0.1 g. AAP, 190.0 g. water, and 3.3 g. cationic monomer solution of Example I
B. 170.0 g. VA emulsified in a mixture of 50.0 g. water 10.5 g. CTMAC, 1.25 g. 70% octylphenol with 30 moles EO, and 9.5 g. cationic monomer solution of Example I C. 86.6 g. water and 0.875 g. AAP The polymerization was carried out by charging a 1-liter stainless steel reactor with charge A, applying a vacuum, and purging with nitrogen three times. Then 25.0 g. vinyl acetate were charged and the temperature was brought up to 75° C. The reactor was pressurized with ethylene to 350 psi and, 30 min. after initiation, the ethylene pressure was raised to 800 psi while charges B and C were slowly and separately pumped in over 5 and 5.5 hrs. respectively. The mixture was held at 75° C. for 2 hrs., cooled, and discharged. The resulting latex was 40.8% solids.

The above latex was compounded with different levels of sodium acetate. Films were cast on a metal plate, dried overnight, and oven-baked at 130° C. for 5 min. The reflux insolubles in DMF are shown below:

| Wt. % NaOAc | % Insolubles |
|---|---|
| 0 | 2.0 |
| 0.3 | 46.0 |
| 0.5* | 46.0 |
| 1.0 | 41.0 |

*Equivalent amount of salt.

The % insolubles show that the polymers were cured by the sodium acetate.

EXAMPLE VIII

This example demonstrates that compounding a pressure sensitive polymer latex with the latent curing salts herein improves the shear adhesion.

The polymer latex was prepared as in Example I except that in Charge D 180.0 g. EA and 295.0 g. 2-EHA were used instead of 425.0 EA and 50.0 g. 2-EHA. The resulting latex was 58.0% solids.

The latex was compounded with the indicated amount of salt, coated on a release paper, and oven-baked at 135° C. (275° F.) for 5 minutes. For the shear adhesion test the film was transferred to a Mylar film and 0.5 sq. in. of the Mylar film was adhered to a steel panel and loaded with 1000 gm. weight. The peel adhesion, which was measured as lb./in. width using an Instron Tensile Tester at a 180° angle, was satisfactory for all the latices and ranged from 1.7–2.7 after 20 min. and 2.2–4.0 after 24 hr. The shear adhesion results are shown below.

| Latent Curing Agent | | |
|---|---|---|
| Salt | Amount Used (wt. %) | Shear Adhesion (hr.) |
| Control | — | 0.4 |
| HCO$_2$Na | 0.40 | 4.8 |
| CH$_3$CO$_2$Na | 0.25 | 1.9 |
| CH$_3$CO$_2$Na | 0.50 | 2.1 |
| CH$_3$CO$_2$Na | 1.00 | 2.7 |
| C$_2$H$_5$CO$_2$Na | 0.50 | 2.9 |
| C$_3$H$_7$CO$_2$Na | 0.67 | 2.5 |
| C$_5$H$_{11}$CO$_2$Na | 0.84 | 2.2 |
| C$_6$H$_{13}$CO$_2$Na | 0.92 | 2.4 |
| C$_7$H$_{15}$CO$_2$Na | 1.00 | 1.9 |
| C$_9$H$_{19}$CO$_2$Na | 1.18 | 1.3 |
| C$_{11}$H$_{23}$CO$_2$Na | 1.24 | 1.2 |
| (CH$_3$CO$_0$)$_2$Ca | 0.49 | 1.5 |
| (CH$_3$CO$_2$)$_2$Ca | 0.98 | 2.0 |
| (CH$_3$CO$_2$)$_3$Al | 0.50 | 1.2 |
| (CH$_3$CO$_2$)$_3$Al | 1.00 | 1.5 |
| NaCl* | 0.50 | 0.5 |

| Latent Curing Agent | | |
|---|---|---|
| Salt | Amount Used (wt. %) | Shear Adhesion (hr.) |
| NaOxalate* | 0.50 | 0.5 |

*Comparative.

The results show that the latent curing agents improved the shear adhesion, with sodium formate showing the most significant improvement. The sodium salts containing anions from the lower acids (up to C$_6$) were somewhat better than those containing anions from the higher acids (up to C$_{11}$). The results show that the salts of multi-valent cations were also effective. The results again demonstrate that inorganic and organic salts (e.g., sodium chloride and sodium oxalate) that form strong acids are not suitable.

EXAMPLE IX

This example studies the storage stability (as indicated by no significant viscosity increase) and curing (as indicated by % insolubles after heat cure) for the latices herein.

Part A—Storage Stability of Latices Containing Cationic Functional Monomer

The latices of Example I, but not thickened as in Example I, where compounded with the indicated amount of salt and stored (120° F.) for up to 23 days. The change in viscosity with time is shown below.

| Curing Agent | | Viscosity (cps.) | | | |
|---|---|---|---|---|---|
| Salt | Amount Used (wt. %) | 0 days | 7 days | 16 days | 23 days |
| Control | — | 508 | 560 | 560 | 575 |
| Control | — | 200 | 230 | 225 | 225 |
| CH$_3$CO$_2$Na | 0.50 | 340 | 355 | 350 | 345 |
| C$_3$H$_7$CO$_2$Na | 0.67 | 342 | 365 | 350 | 375 |
| C$_5$H$_{11}$CO$_2$Na | 0.84 | 295 | 400 | 350 | 350 |
| C$_6$H$_{13}$CO$_2$Na | 0.92 | 298 | 350 | 370 | 375 |
| C$_7$H$_{15}$CO$_2$Na* | 1.00 | | | | |
| C$_9$H$_{19}$CO$_2$Na* | 1.18 | | | | |
| C$_{11}$H$_{23}$CO$_2$Na* | 1.24 | | | | |
| Sodium Sesqui-carbonate** | 1.50 | 178 | 235 | 240 | 230 |

*Coagulated during compounding
**Comparative

The results show that the salts of the lower acids (up to C$_3$) had the best storage stability, that salts of higher acids (up to C$_6$) were better in storage stability than sodium sesquicarbonate but not as good as the lower acids, and that the salts of acids above C$_6$ are unsatisfactory as they caused the latex to coagulate during compounding. This correlates with the shear adhesion results in the previous example where the performance of the salts of acids above C$_6$ was inferior.

Part B—Insolubility Study of Latices Containing Non-Ionic Functional Monomer

Latices were prepared as in Example V except that charges A and D contained 210.0 g. and 115.0 g. of water instead of 192.5 and 105.0 g. The latices were compounded with the indicated salts, cast as films, and cured as in Example IV. The reflux insolubles of the oven-cured films in DMF were determined. The results are shown below.

| Curing Agent | | Insolubles |
| --- | --- | --- |
| Salt | Amount Used (wt. %) | Oven-Cured 5 Min. at 130° C. (%) |
| Control | — | 4.9* |
| $CH_3CO_2Na$ | 0.3 | 20.0 |
| $CH_3CO_2Na$ | 0.5 | 22.6 |
| $CH_3CO_2Na$ | 0.8 | 3.9 |
| $C_7H_{15}CO_2Na$ | 0.5 | 4.0 |
| $C_7H_{15}CO_2Na$ | 1.0 | 6.0 |
| $C_{12}H_{23}CO_2Na$ | 0.5 | 5.0 |
| $C_{12}H_{23}CO_2Na$ | 1.0 | 12.5** |

*Control typically ran between 0.5–5%.
**Coagulated after standing overnight.

The results show that the salts of the higher acids did not cure the polymers as indicated by the percentage insolubles which were no higher than the control. The use of 0.3% and 0.5% sodium acetate was very effective (20% and 22.6% insolubles). The use of 0.8%, which is more than an equimolar amount based on the non-ionic monomer, resulted in no insolubles.

EXAMPLE X

This example demonstrates that the latices are room temperature curable.

Part A—Acrylate-Based Polymer Latex

The latex was prepared as in Part B of Example I except that 2.2 g. of sodium acetate was present in charge D. The latex was cast as films on a metal plate. One film was dried overnight at room temperature and then baked for 5 min. at 130° C. The other film was dried at room temperature and aged for 1 week at room temperature.

The reflux insolubles for the oven-cured film in DMF was 25%, while the insolubles for the room-temperature cured film was 66%.

Part B—Vinyl Acetate-Based Polymer Latex

The latex was prepared as in Example VI except that in charge C 19.0 g. of the monomer solution of Part A was used instead of 32.4 g. and 1.5 g. sodium acetate were present. Also charges E (0.5 g. tertbutyl hydrogen peroxide in 5 g. of water) and F (0.5 g. sodium metabisulfite in 10 g. of water) were post-added. Charges C and D were added separately and slowly over 4.5 hr. The batch was held for 10 min., then charge E was added. The batch was held for 5 min., then charge F was added over 20 min. The batch was held for 10 min., cooled and discharged. Films were cast and dried as above except that the air-dried film was only aged overnight.

The reflux insolubles for the oven-cured film in DMF were 62%, while the insolubles for the room temperature cured film were 55%.

The results show both polymers were cured at room temperature, without extensive aging, by the sodium acetate.

In summary, the present invention is seen to provide shelf-stable, curable, one package aqueous latices containing an alkaline-curable, self-crosslinking emulsion polymer and selected organic acid salts as latent curing agents which are effective even at room temperature.

Now that the preferred embodiments of the invention have been described in detail, various modifications and improvements thereon will become readily apparent to one skilled in the art. Accordingly, the spirit and scope of the claims are to be limited only by the appended claims, and not by the foregoing specification.

What is claimed is:

1. A shelf-stable, curable, one-package latex which consists essentially of a dispersion of an alkaline-curable, self-crosslinking emulsion polymer in water and a salt of an organic acid having the formula $$\left[ R-\overset{O}{\underset{\|}{C}}-O^- \right]_n [M]^{n+},$$

where R is H or a $C_1$–$C_6$ straight or branched chain alkyl or $C_2$–$C_6$ alkenyl, M is an alkali, alkaline earth, or heavy metal, and n is the valence number of M; the self-crosslinking polymer comprising about 90–99.9% by weight of a vinyl polymerizable monomer selected from the group consisting of a vinyl ester of an up to $C_6$ saturated aliphatic monocarboxylic acid; an ester of acrylic or methacrylic acid with a $C_1$–$C_{18}$ alcohol; an acrylamide, methacrylamide, or N-substituted derivative thereof; a vinyl ether; a N-vinyl lactam; a halogenated vinyl compound; an alkyl vinyl ketone; a diester of an α,β-unsaturated dicarboxylic acid; an allyl or methallyl ester of a saturated aliphatic monocarboxylic acid; a vinyl pyrrole, styrene, and an olefin; and about 0.1–10% by weight of a polymerizable cationic or nonionic self-crosslinking monomer selected from the group consisting of a cationic quarternary ammonium monomer having the formula $$\left[ \underset{R^1}{\overset{H_2C=C}{|}}-\overset{O}{\underset{\|}{C}}-A(CH_2)_n-\overset{R^2}{\underset{R^3}{\overset{|}{N^+}}}-CH_2-\underset{OH}{\overset{|}{CH}}-\underset{X}{\overset{|}{CH_2}} \right] Y^-$$

and a nonionic monomer having the formula $$H_2C=\underset{R^5}{\overset{|}{C}}-\overset{O}{\underset{\|}{C}}-O-CH_2-\underset{OH}{\overset{|}{CH}}-\underset{X}{\overset{|}{CH_2}},$$

where $R^1$ and $R^5$ are hydrogen or a methyl group; A is —O— or $$-\underset{R^4}{\overset{|}{N}}-$$

with $R^4$ being hydrogen or a $C_1$–$C_3$ alkyl group; $R^2$ and $R^3$ are independently a $C_1$–$C_6$ alkyl group; X is a halogen; Y is an anion; and n is 1–4; the salt being present in an amount effective to cure the polymer, with or without the application of heat, after application of the dispersion and removal of the water therefrom.

2. The latex of claim 1, wherein the salt is the sodium, calcium, aluminum, or lead salt of formic, acetic, propionic, butyric, valeric, or caproic acid.

3. The latex of claim 2, wherein the salt is present in a more or less equimolar amount based on moles of the self-crosslinking monomer present in the polymer.

4. The latex of claim 2, wherein the cationic quaternary ammonium monomer is the reaction product of N,N-dimethylaminopropyl methacrylamide and epichlorohydrin or of N,N-dimethylaminopropyl methacrylate and epichlorohydrin and wherein the nonionic monomer is 3-chloro-2-hydroxypropyl methacrylate or 3-chloro-2-hydroxypropyl acrylate.

5. The latex of claim 4, wherein the cationic monomer is present in an amount of about 1–5% and wherein the non-ionic monomer is present in an amount of about 0.05–5%.

6. The latex of claim 1, wherein the vinyl polymerizable monomer is the vinyl ester, alkyl acrylate, alkyl methacrylate, styrene, or ethylene.

7. The latex of claim 6, wherein the vinyl ester or acrylate monomer is at least about 5%; or wherein the ethylene monomer is present in amounts of about 0.5–40% and the vinyl ester, being vinyl acetate, in amounts up to about 89.5%.

8. The latex of claim 1, which further consists essentially of a thickener.

9. The latex of claim 8 wherein the thickener is selected from the group consisting water-soluble cellulose derivatives, polyvinyl alcohols, and polyacrylamides.

10. The latex of claim 1, wherein the vinyl polymerizable monomer is vinyl acetate or mixtures thereof with ethyl acrylate, butyl acrylate, and/or 2-ethylhexyl acrylate; ethyl acrylate, butyl acrylate, 2-ethylhexyl acrylate or mixtures thereof; or ethylene and vinyl acetate; wherein the self-crosslinking monomer is the reaction product of N,N-dimethylaminopropyl methacrylamide and epichlorohydrin; the reaction product of N,N-dimethylaminopropyl methacrylate and epichlorohydrin; 3-chloro-2-hydroxypropyl acrylate; or 3-chloro-2-hydroxypropyl methacrylate; wherein the salt is sodium formate, acetate, propionate, butyrate, valerate, or caproate; calcium acetate; aluminum acetate; or lead acetate.

11. The latex of claim 10, wherein the salt is sodium formate or sodium acetate present in a substantially equimolar amount.

12. The latex of claim 10, wherein the vinyl polymerizable monomer is a mixture of ethyl acrylate and 2-ethylhexyl acrylate; vinyl acetate and butyl acrylate; or ethylene and vinyl acetate; wherein the self-crosslinking monomer is present in an amount of about 2–3%; and wherein the salt is sodium acetate.

13. The latex of claim 12, wherein the sodium acetate is present in a substantially storchiometric amount and effective to cure the polymer without the application of heat.

14. The latex of claim 10, further comprising as a thickener hydroxyethyl cellulose.

* * * * *